United States Patent [19]
Schap

[11] Patent Number: 5,755,059
[45] Date of Patent: May 26, 1998

[54] SOLENOID OPERATED CLUTCH FOR POWERED SLIDING DOOR

[75] Inventor: William W. Schap, Spring Lake, Mich.

[73] Assignee: ITT Automotive Electrical Systems, Inc., Auburn Hills, Mich.

[21] Appl. No.: 641,579

[22] Filed: May 1, 1996

[51] Int. Cl.⁶ .................................................. E05F 11/04
[52] U.S. Cl. ................................................... 49/360; 49/362
[58] Field of Search .............................. 49/360, 361, 362, 49/31, 139; 192/84 A, 84 B, 84 C, 84.92, 84.1; 74/335, 342, 7, 6

[56] References Cited

U.S. PATENT DOCUMENTS

| | | |
|---|---|---|
| 2,055,723 | 9/1936 | Hope . |
| 2,969,134 | 1/1961 | Wiedmann et al. . |
| 3,307,666 | 3/1967 | Miller et al. . |
| 4,092,575 | 5/1978 | Ogishi et al. . |
| 4,534,455 | 8/1985 | Fujikawa . |
| 4,916,861 | 4/1990 | Schap . |
| 5,004,280 | 4/1991 | Schap . |
| 5,039,925 | 8/1991 | Schap . |
| 5,063,710 | 11/1991 | Schap . |
| 5,066,056 | 11/1991 | Schap . |
| 5,076,016 | 12/1991 | Adams et al. . |
| 5,105,131 | 4/1992 | Schap . |
| 5,142,923 | 9/1992 | McKnight et al. . |
| 5,155,937 | 10/1992 | Yamagishi et al. . |
| 5,233,789 | 8/1993 | Priest et al. . |
| 5,316,365 | 5/1994 | Kuhlman et al. . |
| 5,432,384 | 7/1995 | Isozumi et al. . |
| 5,483,769 | 1/1996 | Zweili . |

FOREIGN PATENT DOCUMENTS

| | | |
|---|---|---|
| 0421776 A2 | 4/1991 | European Pat. Off. . |
| 2054194 | 4/1971 | France . |
| 1140031 | 11/1962 | Germany . |
| 1221069 | 7/1966 | Germany . |
| 4341153 A1 | 6/1995 | Germany . |

*Primary Examiner*—Harry C. Kim
*Assistant Examiner*—Curtis Cohen
*Attorney, Agent, or Firm*—Thomas N. Twomey; J. Gordon Lewis

[57] ABSTRACT

A powered sliding door system for a vehicle can include a flexible cable having at least one helically wound gear tooth formed on a flexible core or an elongated tape with longitudinally spaced apertures, for generally longitudinal movement along a fixed path. The tape or cable can have a first longitudinally disposed end connected to a movable closure, such as a vehicle sliding door, window, or roof panel. A rotatable drive member drivingly engages the cable or tape intermediate the first and second longitudinal ends. A reversible motor powers the rotation of the rotatable member. A clutch in the form of an axially shiftable transmission gear is operable to selectively interconnect the motor to the rotatable drive member, such that actuation of the motor and engagement of the clutch will cause the rotatable drive member to move the cable or tape longitudinally for opening and closing the portal with the movable closure.

18 Claims, 4 Drawing Sheets

5,755,059

1

SOLENOID OPERATED CLUTCH FOR POWERED SLIDING DOOR

FIELD OF THE INVENTION

The present invention relates to a clutch for selectively transmitting torque and rotary motion from a spindle having an axis of rotation to a drive member, and in particular, is responsive to activation of a solenoid to axially shift rotary transmission gears into an operable position from a normally disengaged position.

BACKGROUND OF THE INVENTION

Power sliding van door drive systems usually require manual override with minimal drag. This feature allows the door to be opened and closed as if it were not power driven. It also allows opening and closing of the door in case of power loss, such as occurs when the battery is dead in an automobile. A clutch system does not require back driving the drive mechanism, thereby minimizing drag during manual operation.

Clutches have previously been proposed for power sliding door systems. For example, one such system used an electromagnetic clutch having a coil for producing a magnetic field when energized. In operation, when an actuated drive motor rotated, it also rotated a clutch member connected to the drive shaft. When the coil was energized, a magnetic field was created which pushes or repels an armature member to engage the clutch member frictionally and thereby be driven. Rotation of the armature member caused a connected gear to rotate with the armature member in order to drive a cable longitudinally back and forth depending on the direction of rotation. This, in turn, moved the sliding door between its open and closed positions. When the coil was de-energized, the armature member was free to move axially away from the clutch member and thereby became disengaged, stopping rotation of the armature and the gear. As a result, the cable was no longer powered longitudinally. The clutch was designed so that it would slip if the door encountered an obstruction while the drive motor was energized, and so that the door could be manually opened and closed.

Due to the limited torque and rotation transferring capability of a friction clutch, it would be desirable to provide a clutch configuration capable of transmitting greater torque and rotation in order to move a heavy sliding door against gravity along an upward incline, such as occurs when a vehicle is parked on an incline.

SUMMARY OF THE INVENTION

While useful in other applications, the power drive system of the present invention is especially well adapted for use in operating the sliding door of a van-type vehicle. All power drive systems for sliding doors require a power system capable of driving an output member coupled to the door in either direction over a relatively long working stroke. In van-type vehicle applications of the power drive system, the sliding door is conventionally mounted at the passenger side of the van, but may also or alternatively be mounted on the driver's side, and a major convenience of the system is that it may be power operated by control switches accessible from the driver's seat. However, if the driver is outside the van loading or unloading articles through the sliding door, the power controls are out of reach and there are many occasions where, in this situation, the driver will want to open or close the door manually. Further, it is desirable in the

2 present invention to normally maintain the clutch in a disengaged position. In addition, it is desirable in the present invention to cause the clutch to engage in response to a switched signal of the power drive for the system.

The present invention uses a twelve volt direct current solenoid to axially shift a transmission gear from a disengaged position to an engaged position when activated. The transmission gear includes a rotating hub having a large diameter gear and a smaller diameter gear attached thereto. The hub rides on a shaft for rotation and axial shifting movement with respect to the shaft. A spring is disposed between the shaft and the rotatable hub to normally maintain the hub and attached gears out of engagement with the drive member. This is the normal disengaged condition allowing manual sliding door operation free of the power drive motor. A first gear is attached to the motor and operatively engages the second larger diameter gear of the rotating hub. When the solenoid is energized, the solenoid overcomes the spring biasing the rotating hub into the normally disengaged condition to axially shift the rotating hub and attached second and third gears, so that the third smaller diameter gear connected to the rotating hub operably engages with a fourth gear connected to the drive member in order to initiate the sliding door powered motion. The drive member can include a tooth form operable to longitudinally drive an elongated, flexible, door-engaging member in either rotational direction. The mating tooth corners on the third and fourth gears are "sharpened" to points to allow free engagement when the teeth are not properly aligned. In addition, the solenoid is energized slightly before the electric motor to complete engagement before power is applied.

A clutch according to the present invention selectively transmits torque and rotary motion from a spindle having an axis of rotation to a drive member. A solenoid selectively connectible to a source of power can be energized to move between a normal rest position and an activated position. An axially shiftable gear means is connected between the spindle and the drive member for rotation about an axis and for movement axially with respect to the axis of rotation between an engaged position and a disengaged position with respect to the drive member. The gear means is responsive to the solenoid being energized for moving into the engaged position and responsive to the solenoid being de-energized for moving into the disengaged position. Biasing means is provided for normally maintaining the gear means in the disengaged position when the solenoid is in the rest position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
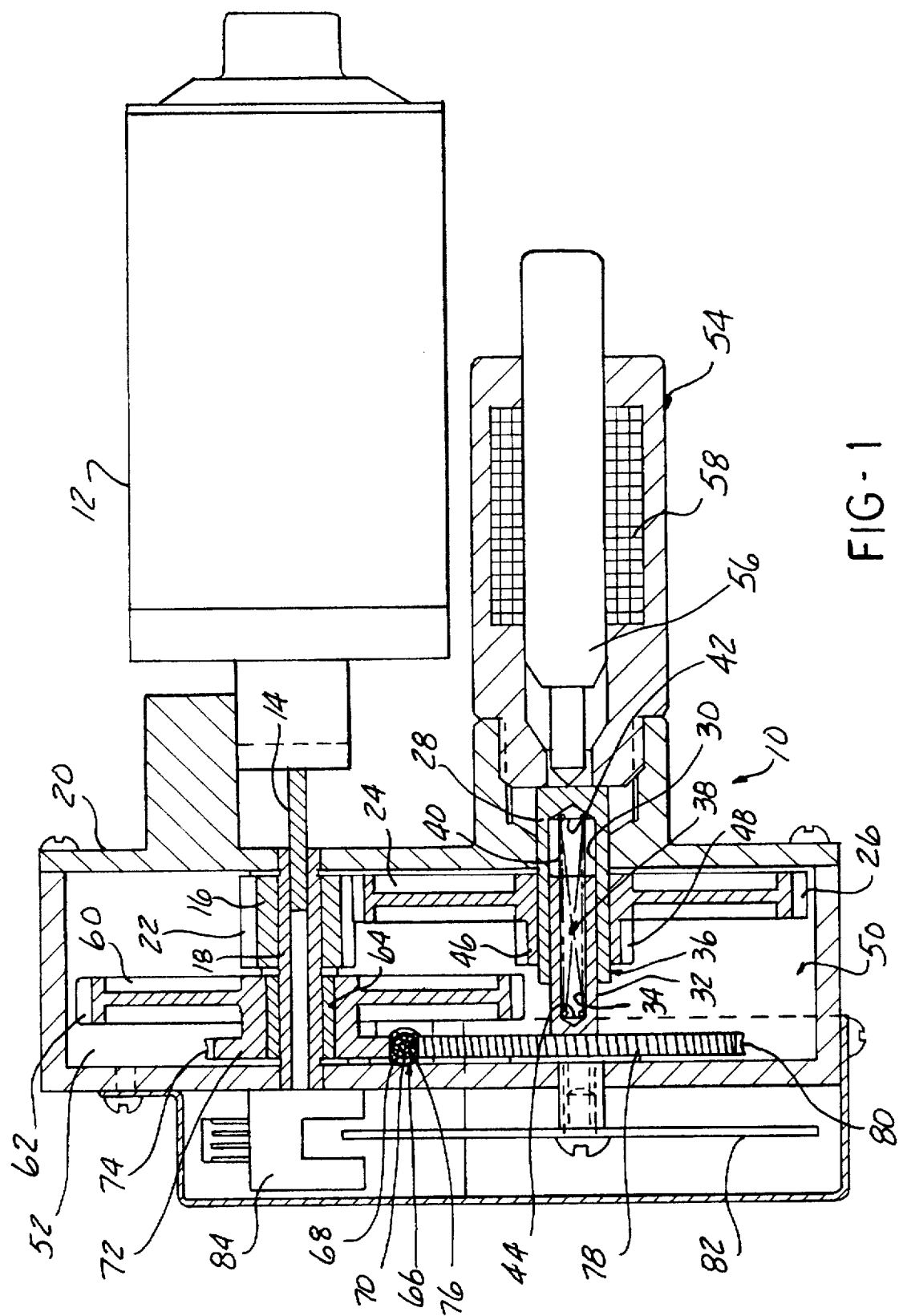
FIG. 1 is a cross-sectional view of a clutch according to the present invention in a disengaged position.
Figure 2:
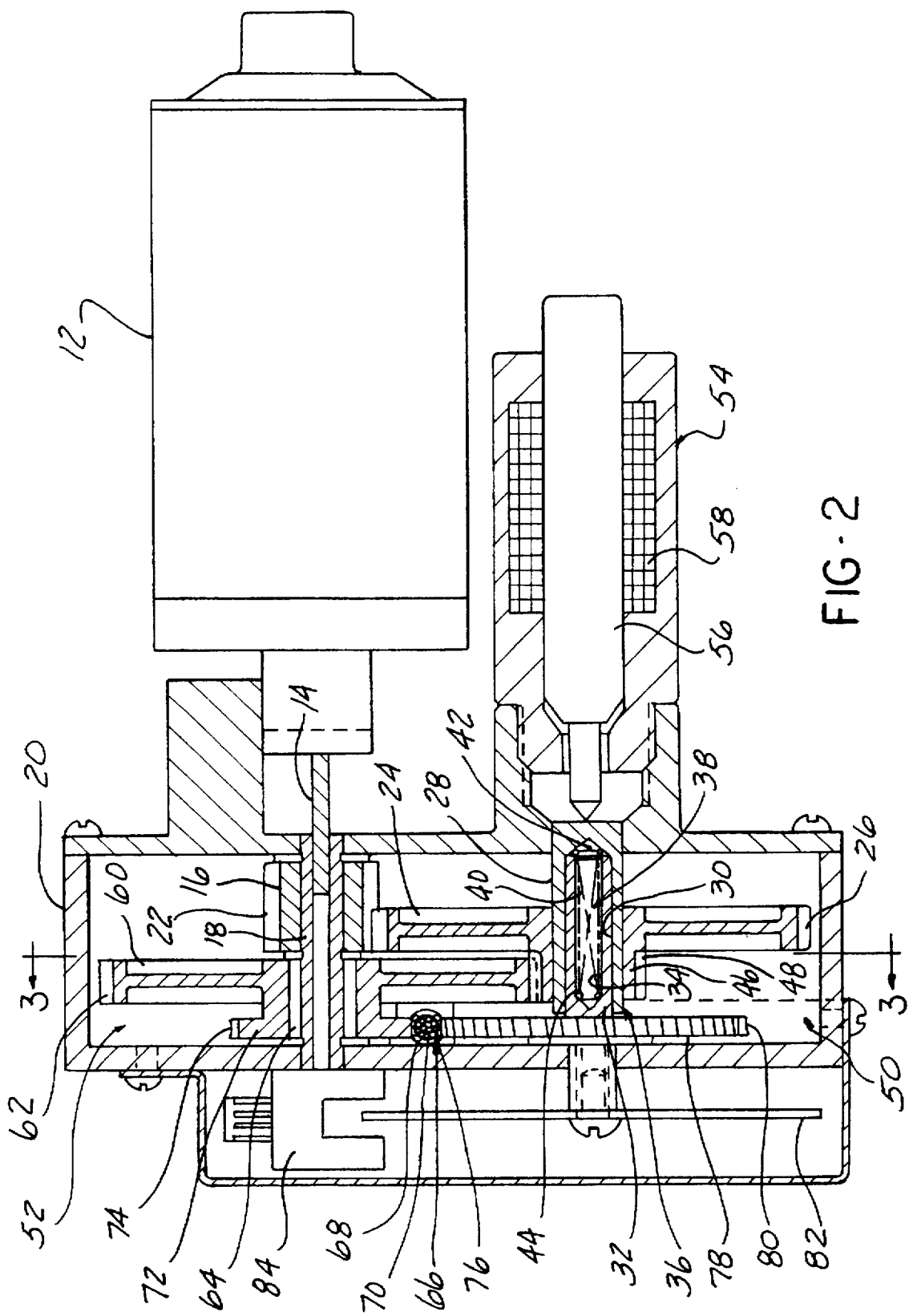
FIG. 2 is a cross-sectional view of the clutch according to the present invention in an engaged position.
Figure 3:
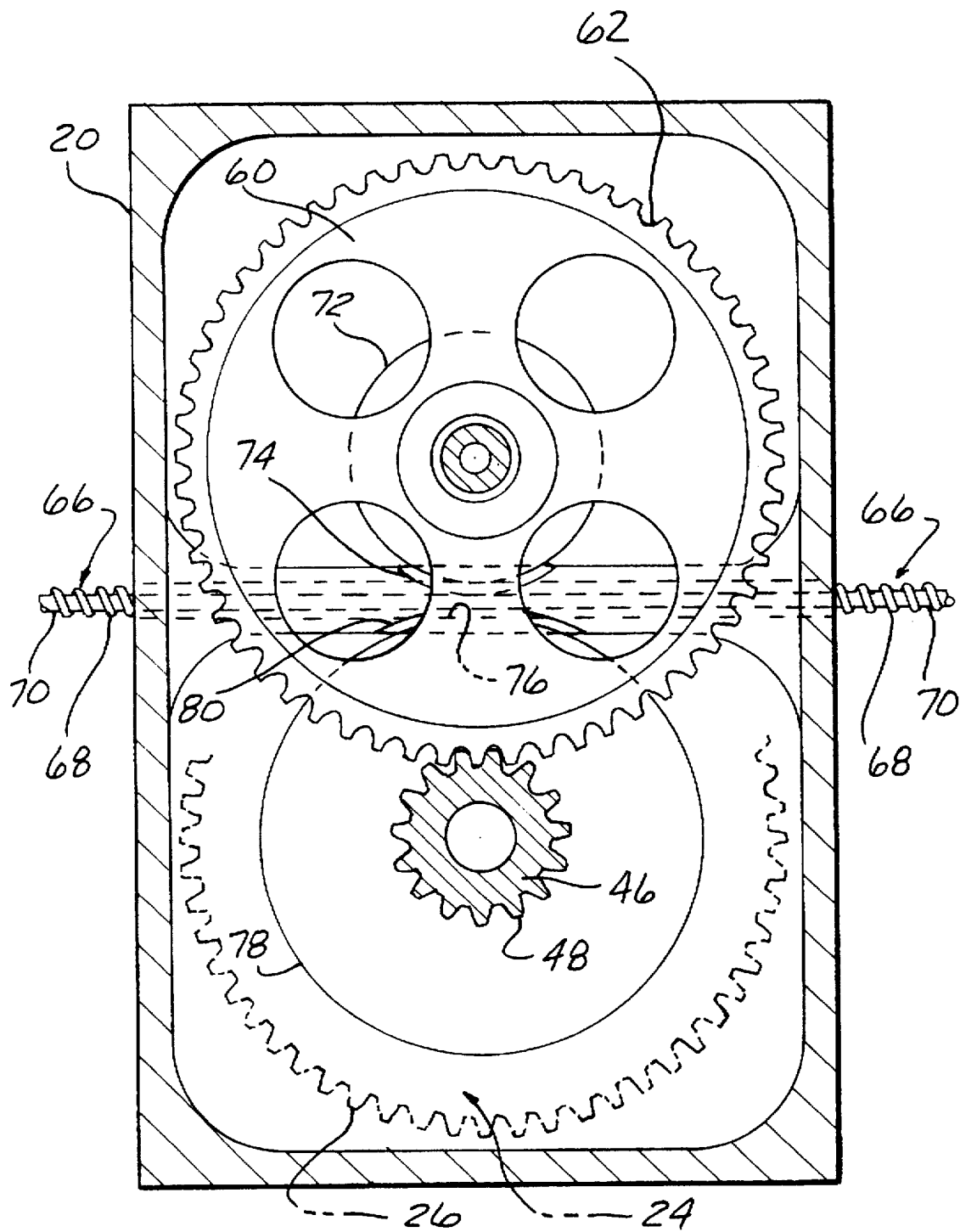
FIG. 3 is a cross-sectional view of the clutch taken as shown in FIG. 2.
Figure 4:
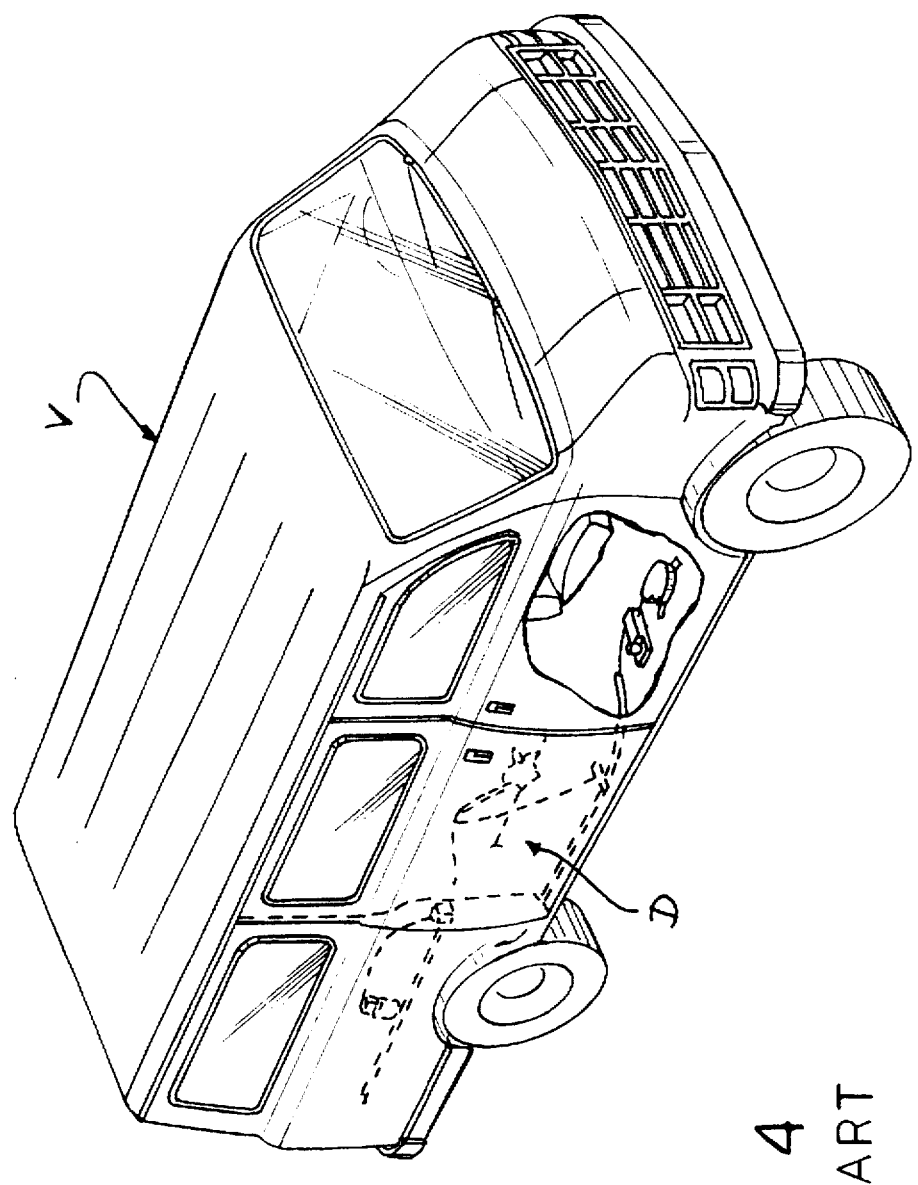
FIG. 4 is a perspective view of a van having a movable closure, such as a powered sliding door.

More detailed descriptions of power drive systems for operating a sliding door D of a van-type vehicle as illustrated in FIG. 4 can be found in U.S. Pat. No. 4,916,861; U.S. Pat. No. 5,004,280; U.S. Pat. No. 5,039,925; U.S. Pat. No. 5,066,056 and U.S. Pat. No. 5,105,131 which are incorporated herein by reference. A clutch 10 according to the present invention is illustrated in FIGS. 1–3. The clutch 10 is connectible to a source of rotary power, such as electric motor 12. The motor 12 includes a rotatable output shaft 14. A first gear 16 is connected to the output shaft 14 for rotation with the output shaft 14, such as by connection through rotatable shaft 18. Rotatable shaft 18 can be formed with a longitudinally extending aperture therein and having a cross-sectional shape adapted to receive an outer end of the rotatable output shaft 14 so that shaft 18 is coupled to the output shaft 14 for rotation in response to rotation of the motor 12. The rotatable shaft 18 can be supported at opposite ends for rotation with respect to a housing 20.

The first gear 16 has teeth 22 operably engageable and intermeshing with a second gear 24 which has complimentary shaped teeth 26 formed on a circumference of the external periphery of the second gear 24. The second gear 24 is connected to a rotatable hub 28 for rotation with the hub 28 about an axis of rotation. Preferably, the axis of rotation is parallel to and offset from the axis of rotation of the output shaft 14. The hub 28 has a longitudinally extending aperture 30 formed in one end extending over a substantial portion of the longitudinal length of the hub 28.

A stationary post or a second rotatable shaft 32 is slidably and rotatably received within the aperture 30 formed in the one end of the rotatable hub 28. The second shaft 32 can have a second longitudinally extending aperture 34 formed in the end of the second shaft 32 sheathed within the rotating hub 28. The first and second apertures, 30 and 34 respectively, defining an expandable and collapsible chamber enclosed between the second shaft 32 and the hub 38. When the hub 28 is assembled with respect to the second shaft 32, the combination defines a combined shaft 36 having opposite ends rotatable independently of one another and rotatably supported by the housing 20. Biasing means 38 is disposed within the chamber defined by the first and second apertures, 30 and 34, for normally urging the rotatable hub 28 in an unsheathing longitudinal direction with respect to the second shaft 32. In the preferred configuration, the biasing means 38 can include a compression spring 40 having a first end 42 engaging a spring seat defined by the blind end of the first longitudinally extending aperture 30 in the rotatable hub 28, and a second end 44 engaging an opposing spring seat defined by the blind end of the second aperture 34 formed in the second shaft 32.

A third gear 46 is connected to the hub 28 for rotation with the hub 28 and connected second gear 24. The third gear 46 includes a plurality of teeth 48 formed along the external periphery of the third gear 46. The combination of the hub 28, second gear 24 and third gear 46 defining an axially shiftable transmission gear means 50 connected between the output shaft 14 and a drive member 52 for rotation about the longitudinal axis of the hub 28 and for moving axially with respect to the rotational axis of the hub 28 between a disengaged position illustrated in FIG. 1 and an engaged position illustrated in FIG. 2. The gear means 50 is responsive to a solenoid 54 being energized for moving from the disengaged position into the engaged position. The gear means 50 is responsive to the urging of the biasing means 38 after the solenoid is de-energized for moving into the disengaged position.

The solenoid 54 can be connected to the housing 20 with a plunger 56 engageable with an end of the hub 28 opposite from the first longitudinally extending aperture 30. When the coil 58 of the solenoid 54 is energized, the plunger 56 is driven toward the hub 28 causing the hub 28 to move axially toward the second shaft 32 to further sheath the second shaft 32 within the aperture 30 of the hub 28. The hub 28 in response to the urging of the plunger 56 after activation of the coil 58 overcomes the force of the biasing means 38, such as compression spring 40. When the coil 58 is no longer energized, the urging of the biasing means 38 causes the hub 28 to return to the original rest position.

When the coil 58 of the solenoid 54 is energized, the teeth 48 of the third gear 46 operably engage with a fourth gear 60 connected to the drive member 52. The fourth gear 60 has a plurality of teeth 62 formed along the external periphery of the gear 60. In the illustrated embodiment, the drive member 52 is mounted for independent rotation with respect to the first shaft 18, such as by bearing sleeve 64 disposed between the drive member 52 and the shaft 18. When the coil 58 is not energized, the teeth 48 of the third gear 46 are disengaged from the teeth 62 of the fourth gear 60. The movable member, such as a sliding van door, driven by the drive member 52 can be manually operated when the solenoid is not energized and the teeth 48 of the third gear 46 are disengaged from the teeth 62 of the fourth gear 60 formed on the drive member 52.

A sliding door drive system according to the present invention can use a push/pull cable or tape 66 connected at one end to a movable closure, such as a sliding door for a van-type vehicle. The push/pull cable or tape 66 can be guided during longitudinal movement within a guide track which extends parallel to the path of movement of the door with respect to the portal or door opening. The cable or tape 66 is driven in longitudinal movement by a reversible electric motor 12 controlled by an electronic control unit in a manner such that the door may be automatically stopped in response to sensing of an overload, such as the jamming of an object between the closing door and the door frame, or providing for express operation and cancellation. A cable 66 can include a helically extending gear tooth 68 having uniformly spaced turns around a flexible core 70 to define a single lead, double lead, triple lead or other multiple lead thread or tooth as desired for the particular application or a tape 66 can include an elongated tape with a rectangular cross-section and longitudinally spaced apertures formed therein.

The drive member 52 is rotatably mounted within the housing 20 which is fixed to surrounding stationary structure or a frame member. The drive member 52 engages and selectively moves the cable or tape 66 longitudinally to position the movable closure between the open position and the closed position with respect to a portal defining a passage through a barrier, such as a wall, roof or the like. The barrier is a construction forming an extended indefinite surface preventing or inhibiting the passage of persons or things, and can include a wall, ceiling, roof or cover for a stationary structure or a movable vehicle. The portal is structure defining an opening through the barrier for passage of persons or things, such as the frame of a door, window, hatch or roof panel opening. The movable closure is an obstructive structure whose presence in or before a passage bars traffic through the passage and is mounted to move in a regular, repetitive, predetermined path with respect to the portal so as to alternately open or close the passage, and can take the form of a hatch, a sliding window, a roof panel or a sliding door. The motor driven member 52 causes the cable or tape 66 to move in a predetermined path which may be straight, curved, or tortuous.

A fifth gear 72 is connected to the fourth gear 60 for rotation with the fourth gear 60. The fourth and fifth gears, 60 and 72, are rotatably mounted with respect to the first shaft 18 through bearing sleeve 64. The fifth gear 72 includes arcuate teeth 74 operably engageable with at least one of the helically wound gear teeth 68 formed on flexible core 70 of cable 66, or alternatively can be formed as protrusions engageable with the longitudinally spaced apertures formed in the tape 66, in order to drive the cable or tape 66 in either longitudinal direction in response to rotary movement of the fifth gear 72. In order to maintain the cable or tape 66 in operable engagement with the fifth gear 72, a thrust opposing surface 76 is provided to maintain the cable or tape 66 in operable contact with the protrusions or arcuate teeth 74 of the fifth gear 72. In the preferred embodiment, the thrust opposing surface 76 is defined by the external periphery of a sixth gear 78 mounted on second shaft 32 for rotation with the second shaft 32. The sixth gear 78 includes protrusions or arcuate teeth 80 operably engageable with the longitudinally spaced apertures of the tape or the at least one helically wound tooth 68 of cable or tape 66 for rotation in either direction in response to longitudinal movement of the cable 66 in either longitudinal direction in response to rotation of the drive member 52. An encoder disk or wheel 82 can be connected to the second shaft 32 for rotation with the sixth gear 78. An encoder sensor 84 can be connected to the housing 20 for operably sensing rotation of the encoder disk 82. The sensor means 84 is provided for sending a signal to an electronic control unit in response to sensed movement of the disk 82 so that the position of the movable closure, such as a sliding door, can be accurately tracked by the electronic control unit during both manual and powered operation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A clutch for selectively transmitting torque and rotary motion to a drive member comprising:

a spindle having an axis of rotation;

a first gear connected to said spindle;

axially shiftable gearing means connectible between said spindle and said drive member for rotation about an axis and for moving axially with respect to said axis of rotation between an engaged position and a disengaged position;

reciprocating means for moving said axially shiftable gearing means along a fixed path between a normal rest position and an activated position, said axially shiftable gearing means responsive to said reciprocating means for moving from said disengaged position into said engaged position, said axially shiftable gearing means including a second gear operably intermeshing with said first gear and moveable axially while said first and second gears are intermeshing between said engaged position and said disengaged position, and a third gear connected to said second gear with a common axis of rotation for driving said drive member in response to rotary movement of said second gear when said second and third gears are in said engaged position; and biasing means for normally maintaining said axially shiftable gearing means in said disengaged position when said reciprocating means is in said rest position.

2. The clutch of claim 1 further comprising:

said reciprocating means including a solenoid connectible to a source of power for moving from said rest position to said activated position in response to energizing said solenoid.

3. The clutch of claim 1 further comprising:

said biasing means including a compression spring engageable with said axially shiftable gearing means for urging said axially shiftable gearing means normally toward said disengaged position.

4. The clutch of claim 1 further comprising:

a fourth gear operably intermeshing with said third gear when said third gear is in said engaged position and disengaged from said third gear when said third gear is in said disengaged position.

5. The clutch of claim 1 further comprising:

a moveable closure moveable by said drive member along a fixed path between an open position and a closed position; and sensing means for generating a signal corresponding to a location of said moveable closure along said fixed path during manual and powered operation.

6. The clutch of claim 1 further comprising:

a barrier;

a portal defined through said barrier;

a moveable closure reciprocal along a fixed path between an open position clear of said portal and a closed position obstructing said portal; and an elongated push/pull member connected at one longitudinal end to said closure and operably engaged intermediate said longitudinal ends to drive said push/pull member longitudinally in either direction, such that said closure is moved between said open and closed position.

7. The clutch of claim 6 wherein said barrier is a vertically extending side wall of a motor driven vehicle, wherein said portal is a frame defining an opening in said side wall for a sliding door, and wherein said closure is a sliding door mounted for movement with respect to said side wall of said vehicle.

8. The clutch of claim 6 wherein said push/pull member is a flexible cable having at least one helically wound gear tooth formed on a flexible inner core.

9. The clutch of claim 6 wherein said push/pull member is an elongated tape having generally rectangular cross section and a plurality of longitudinally spaced apertures.

10. A powered sliding door system for a vehicle comprising:

a push/pull member for generally longitudinal movement along a fixed path and having a first longitudinal end and a second longitudinal end, and means adjacent said first end for securing said push/pull member to a sliding door;

driving means for drivingly engaging said push/pull member intermediate said first and second ends;

means for powering said driving means;

a first gear connected to said powering means for rotation; and gearing means for selectively operatively interconnecting said powering means and said driving means, such that actuation of said powering means and engagement of said gearing means will cause said driving means to move said push/pull member longitudinally for opening and closing said sliding door, said gearing means including a second gear operably intermeshing with said first gear and moveable axially while said first and second gears are intermeshing between an engaged position and a disengaged position, and a third gear connected to said second gear with a common axis of rotation for driving said driving means in rotation in response to rotary movement of said second gear when said second and third gears are in said engaged position.

11. The system of claim 10 further comprising:

reciprocating means movable along a fixed path between a normal rest position and an activated position, said reciprocating means for selectively moving said gearing means between an engaged position and a disengaged position.

12. The system of claim 11 further comprising:

said reciprocating means including a solenoid connectible to a source of power for moving from said rest position to said activated position in response to energizing said solenoid.

13. The system of claim 10 further comprising:

said driving means including a fourth gear operably intermeshing with said third gear when said third gear is in said engaged position and disengaged from said third gear when said third gear is in said disengaged position.

14. The system of claim 10 further comprising:

biasing means for urging said gearing means normally toward a disengaged position.

15. The system of claim 14 wherein said biasing means includes a compression spring operably engageable with said gearing means.

16. The system of claim 10 further comprising:

said said driving means for driving said sliding door along a fixed path between an open position and a closed position; and sensing means for generating a signal corresponding to a location of said sliding door along said fixed path during manual and powered operation.

17. A powered sliding door system for a vehicle comprising:

a push/pull member for generally longitudinal movement along a fixed path and having a first longitudinal end and a second longitudinal end, and means adjacent said first end for securing said push/pull member to a sliding door;

driving means for drivingly engaging said push/pull member intermediate said first and second ends;

means for powering said driving means;

gearing means for selectively operatively interconnecting said powering means and said driving means, such that actuation of said powering means and engagement of said gearing means will cause said driving means to move said push/pull member longitudinally for opening and closing said sliding door, said gearing means including a is pair of axially spaced gears having a common axis of rotation, said pair of gears axially shiftable while intermeshing one of said gears with one of said powering means and said driving means from a first position disengaged from the other of said powering means and driving means, to a second position operably interconnecting said powering means and said driving means; and reciprocating means moveable along a fixed path between a normal rest position and an activated position, said reciprocating means for selectively moving said gearing means between said first position and said second position.

18. The system of claim 17 further comprising:

biasing means for urging said gearing means normally toward said first position.

* * * * *